United States Patent
Johnson et al.

(10) Patent No.: US 10,023,390 B2
(45) Date of Patent: Jul. 17, 2018

(54) RECONFIGURABLE CHAIN GUIDE SYSTEM

(71) Applicant: R.A. Pearson Company, Spokane, WA (US)

(72) Inventors: Michael James Johnson, Spokane, WA (US); David John Nelson, Spokane, WA (US); Daniel Vincent Brown, Rosalia, WA (US)

(73) Assignee: R.A. Pearson Company, Spokane, WA (US)

( * ) Notice: Subject to any disclaimer, the term of this patent is extended or adjusted under 35 U.S.C. 154(b) by 0 days.

(21) Appl. No.: 15/390,289

(22) Filed: Dec. 23, 2016

(65) Prior Publication Data

US 2017/0183162 A1    Jun. 29, 2017

Related U.S. Application Data

(60) Provisional application No. 62/387,555, filed on Dec. 24, 2015.

(51) Int. Cl.
| | |
|---|---|
| *B65G 23/06* | (2006.01) |
| *B65G 21/20* | (2006.01) |
| *B65G 21/00* | (2006.01) |
| *F16H 7/18* | (2006.01) |

(52) U.S. Cl.
CPC .............. *B65G 21/20* (2013.01); *F16H 7/18* (2013.01); *F16H 2007/185* (2013.01)

(58) Field of Classification Search
None
See application file for complete search history.

(56) References Cited

U.S. PATENT DOCUMENTS

| | | |
|---|---|---|
| 2,685,361 A | 8/1954 | Garman |
| 3,196,806 A | 7/1965 | Brunder |
| 3,885,837 A | 5/1975 | Mellor |

(Continued)

FOREIGN PATENT DOCUMENTS

| | | |
|---|---|---|
| DE | 3419981 A1 | 12/1985 |
| DE | 19738290 A1 | 3/1999 |

(Continued)

OTHER PUBLICATIONS

"Type CKG 14H", retrieved from the internet on, Aug. 21, 2009, <<http://www.murtfeldt.com/products/chain-belt-and-sliding-guides/chain-guides-for-roller-chains/type-ckg-14h/>>, 2 pages.

*Primary Examiner* — Kavel Singh
(74) *Attorney, Agent, or Firm* — Lee & Hayes, PLLC

(57) ABSTRACT

A reconfigurable chain guide system is described herein. In one example, movable and stationary pieces of chain guide define a chain path. An actuator moves the movable piece of chain guide between first and second positions with respect to the stationary piece of chain guide. A length of the chain path is not changed when the movable piece of chain guide is moved between the first and second positions. This may be accomplished, for example, if the movable piece includes first and second curved segments, which contact the chain in the first and second positions of the movable piece of chain guide, respectively. In an operational example, a chain traveling the chain path may carry a flight lug, which may engage or not engage cases moving on a conveyor depending on a position of the movable piece of chain guide.

19 Claims, 8 Drawing Sheets

(56) References Cited

U.S. PATENT DOCUMENTS

| | | |
|---|---|---|
| 3,971,325 A | 7/1976 | Evans |
| 4,846,337 A | 7/1989 | Kuhlmann |
| 5,443,014 A | 8/1995 | Belanger et al. |
| 6,129,202 A | 10/2000 | Layne et al. |
| 7,712,599 B1 * | 5/2010 | Landrum ........... B65G 47/2445 198/411 |
| 9,445,609 B2 * | 9/2016 | Nakamura ........... A22C 15/001 |
| 9,457,960 B2 * | 10/2016 | Andreoli ................ B65G 21/20 |
| 2008/0026895 A1 | 1/2008 | Johnson et al. |

FOREIGN PATENT DOCUMENTS

| | | |
|---|---|---|
| DE | 202007009188 | 10/2007 |
| EP | 0366170 A1 | 5/1990 |

* cited by examiner

RECONFIGURABLE CHAIN GUIDE SYSTEM

RELATED APPLICATIONS

This patent application is related to U.S. provisional patent application Ser. No. 62/387,555, titled "Reconfigurable Chain Guide System" and filed on Dec. 24, 2015, commonly assigned herewith, and hereby incorporated by reference.

BACKGROUND

Chain guides are known for a variety of purposes. In one example, the chain may resemble a bicycle chain, may be moved by a drive sprocket, and may drive one or more driven or passive sprockets. The chain may provide energy for a purpose, such as to move product on an assembly line. A chain guide may constrain a chain to follow a particular course. The chain may be made of steel or other material, and be captured for movement along a particular course by the chain guide, which may be made of an ultra-high molecular weight material.

Such a course, defined by a chain guide, advantageously moves the chain in desired direction(s) and protects the chain. Additionally, the chain guide protects people, machinery and product from contact with the chain.

However, while the course within which the chain is captured may be advantageously defined, the chain guide itself may provide additional design constraints on systems engineers who must integrate a number of components into a working machine.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

This disclosure describes a system, structure, techniques and method of operation that provide a reconfigurable chain guide system. In an example, a reconfigurable chain drive system may be used to propel cases (e.g., cardboard boxes) or other objects along a conveyor. The reconfigurable chain drive system may include a movable piece of chain guide and a stationary piece of chain guide (or second movable piece of chain guide). The movable piece of chain guide and the stationary piece of chain guide define a chain path. The chain guide may be made of an ultra-high molecular weight (UHMW) material that may define a track shaped to captivate a chain. That is, the chain may be captured (fixed within the track defined by the chain guides) based on a relationship between the size and shape of chain links and the size and shape of the track defined within the chain guides.

An actuator is configured to move the movable piece of chain guide between at least first and second positions with respect to the stationary (or second movable) piece of chain guide. The actuator may be an air-powered cylinder, motor or other device, as indicated by design requirements. The actuator may be controlled by a microprocessor, logic controller circuit or other electronic or mechanical means. In representative examples, the actuator is controlled so that it will move the movable piece of chain guide between raised and lowered positions, or between extended and retracted positions, etc. In a lowered position, a flight lug carried by the chain may be located where it does not interfere with a case (e.g., cardboard box) on a conveyor. In a raised position, the flight lug carried by the chain may be positioned to push the case, and to thereby advance it on the conveyor.

The length of the chain path is not changed when the movable piece of chain guide is moved between, or positioned at, the first and second positions. An example movable piece includes first and second curved segments. When the movable piece of chain guide is in a first position (e.g., in response to movement by the actuator), the chain contacts the first curved segment of the movable piece. When the movable piece of chain guide is in a second position, the chain contacts the second curved segment of the movable piece. Accordingly, the chain path is constrained at a constant length.

Example System and Techniques

Figure 1:
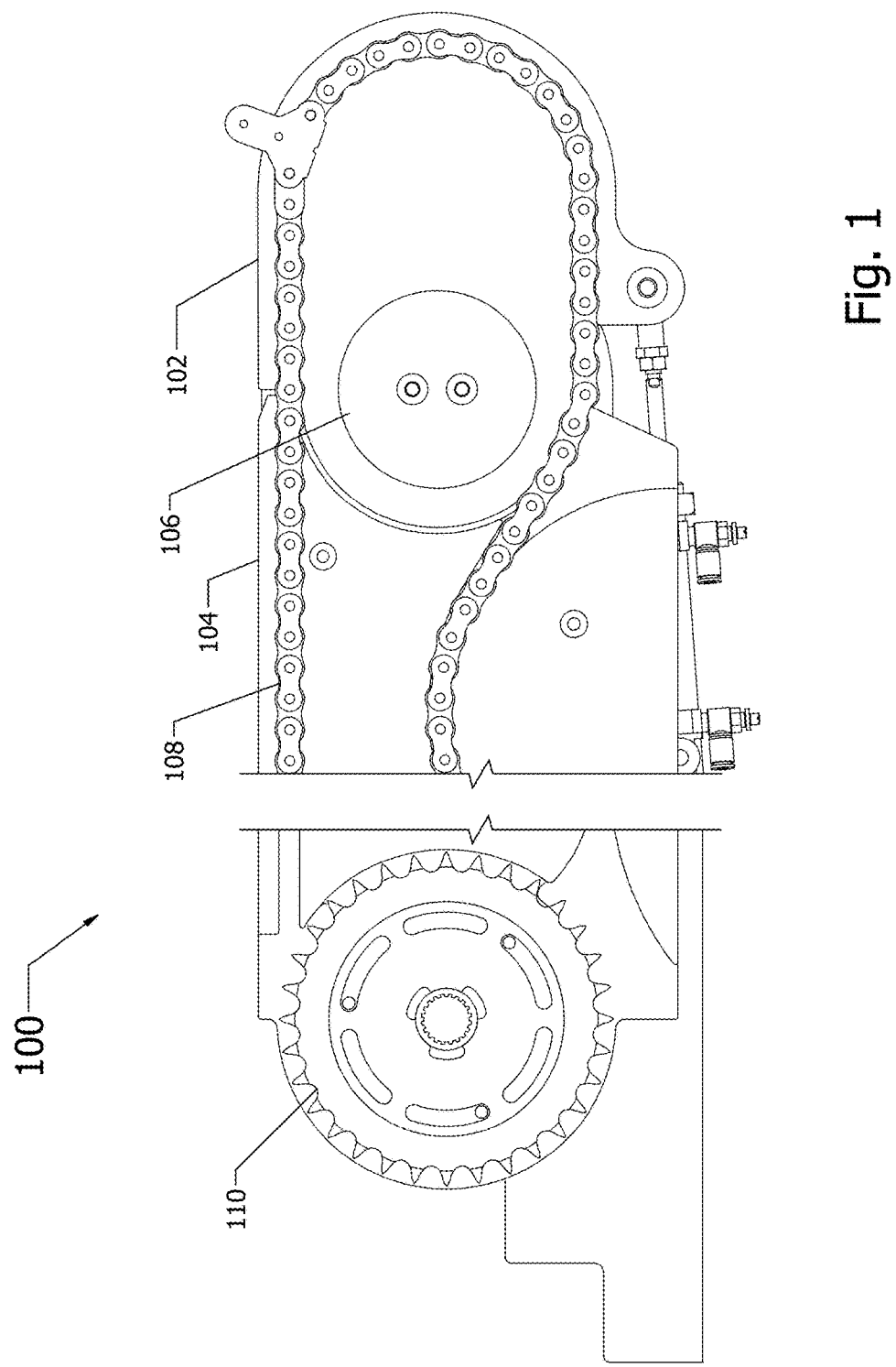
FIG. 1 is an orthographic view of an example reconfigurable chain guide system, wherein a movable piece of chain guide is in a raised configuration, and wherein a flight lug is elevated to a plane on which cases travel in response to movement of the flight lug.

FIG. 1 is an orthographic view of an example reconfigurable chain guide system 100. The chain guide system 100 may form part of a conveyor system, which moves cases (e.g., cardboard boxes, either empty or full of product) along a conveyor belt or system. In the view shown, a movable piece of chain guide 102 and a stationary piece of chain guide 104 are movable with respect to each other. The movable piece of chain guide 102 defines a first section of a chain path, while the stationary piece of chain guide 104 defines a second section of the chain path. The chain 108, moving within both sections of chain path, may be used to push cases within the conveyor system.

Figure 2:
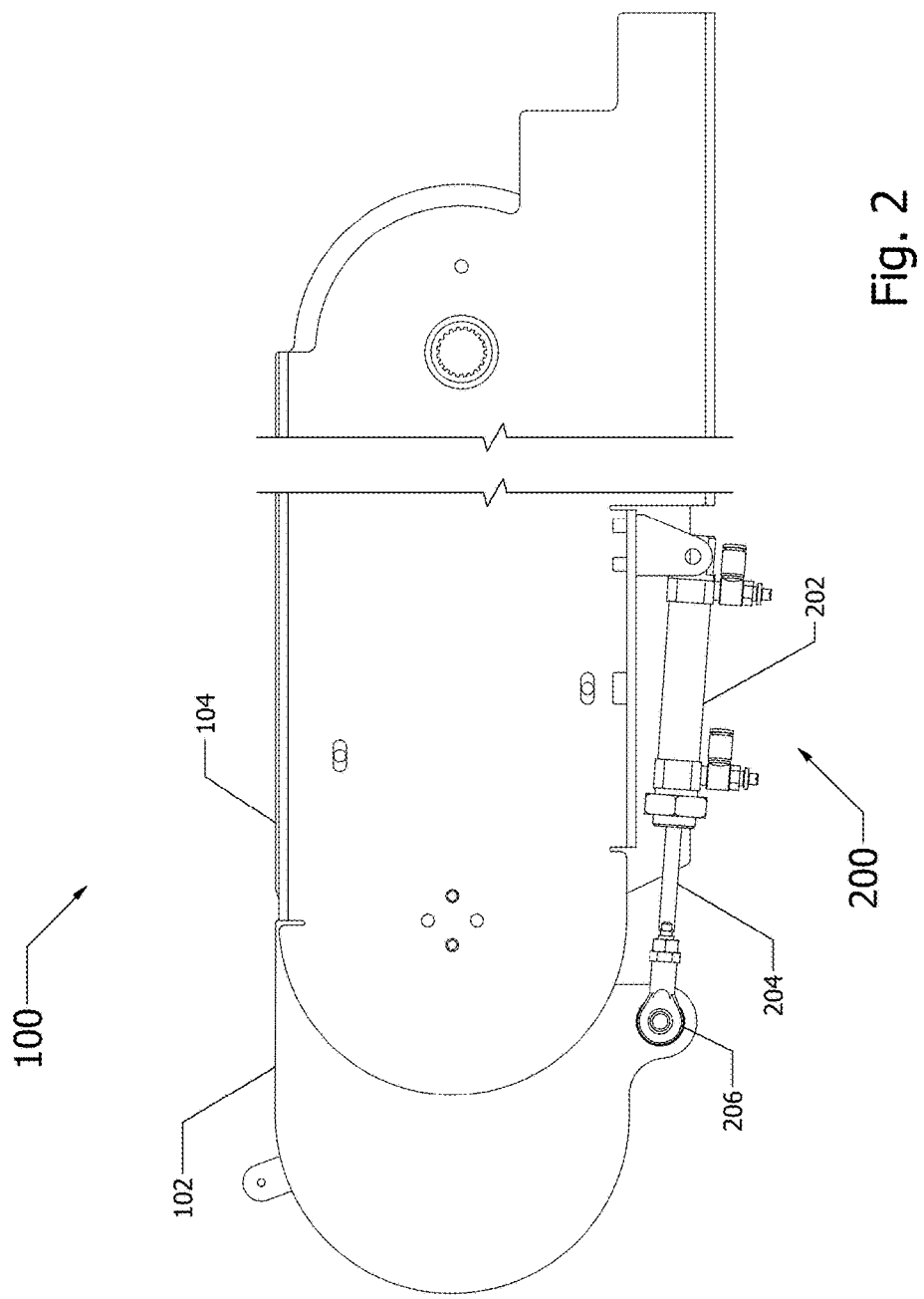
FIG. 2 an orthographic view of a reverse side of the example reconfigurable chain guide system, wherein the movable piece of chain guide is in the raised configuration.
Figure 3:
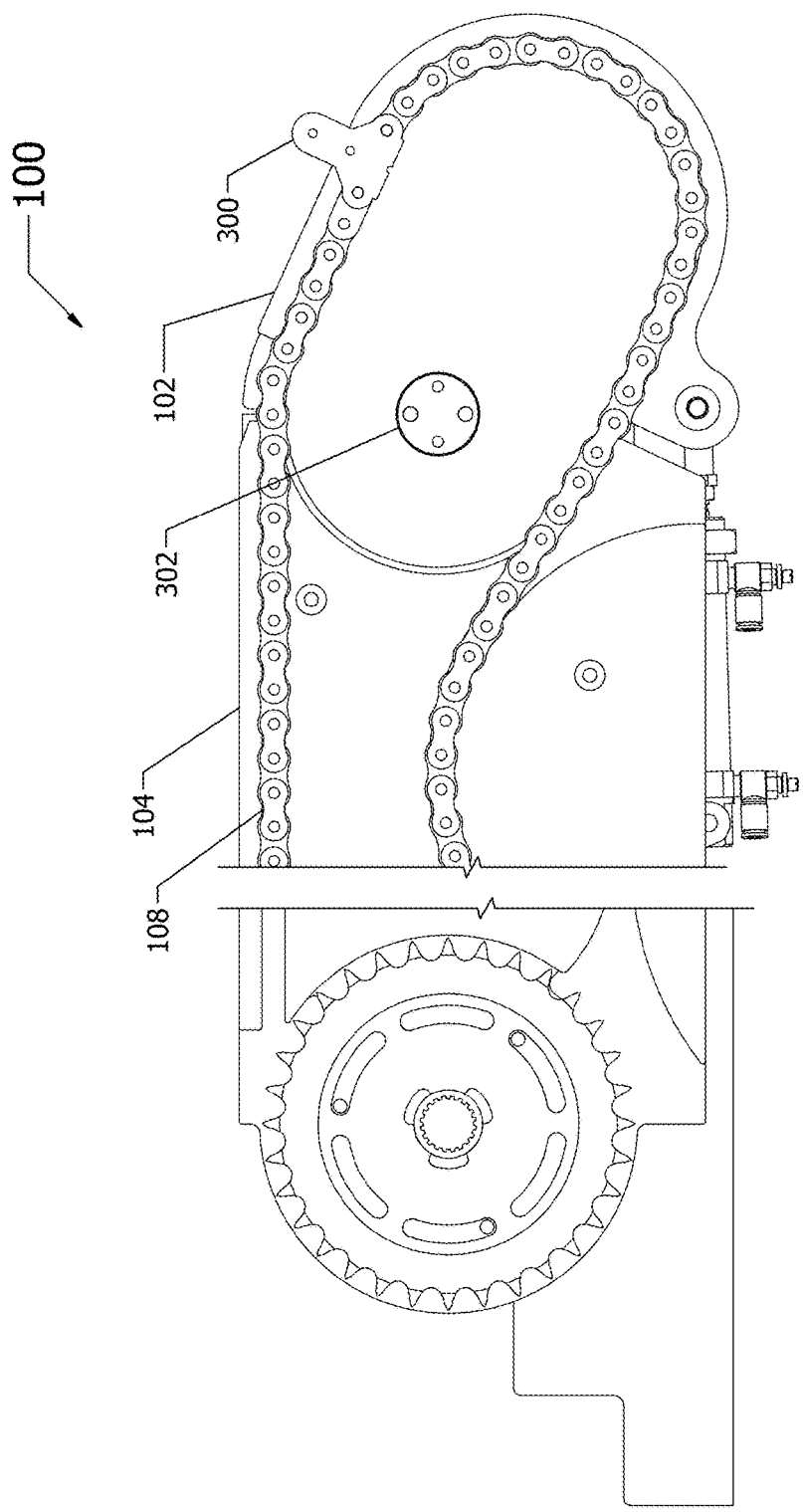
FIG. 3 is an orthographic view of the example reconfigurable chain guide system, wherein the movable piece of chain guide is in a lowered configuration, and wherein the flight lug is lowered below the plane on which cases travel, thereby enabling cases to move without contact with the flight lug.

FIG. 1 shows the movable piece of chain guide 102 is in a "raised" configuration, which contrasts with the "lowered" configuration seen in FIG. 3. The movable piece of chain guide 102 is configured to move with respect to the stationary piece of chain guide 104 about a pivot (seen in FIG. 2) that is covered by a cover plate 106 in the view shown. A chain 108 may be constructed of an endless loop of links, and installed in a chain track (best seen in FIG. 6). A drive sprocket 110 may be located on the stationary piece of chain guide 104. The drive sprocket 110 engages and drives the chain (contact between the chain and drive sprocket is not shown, to reveal detail of the drive sprocket).

FIG. 2 an orthographic view of a reverse side of the reconfigurable movable chain guide system 100 of FIG. 1. In a manner similar to the view of FIG. 1, the movable piece of chain guide 102 is shown in the "raised" configuration. In the example illustrated, an actuator 200 is configured as an air-powered cylinder 202 having an actuator drive shaft 204 connected to rod end 206. While the configuration could be reversed, the air-powered cylinder 202 is attached to the stationary piece of chain guide 104, and the actuator rod end 206 is attached to the movable piece of chain guide 102. In the view of FIG. 2, the actuator drive shaft 204 is extended, thereby rotating the movable piece of chain guide 102 about a pivot (see pivot 302 in FIG. 3) and into the "raised" configuration.

FIG. 3 is an orthographic view of the example reconfigurable chain guide system 100. In the view shown, a movable piece of chain guide 102 is in a "lowered" configuration, which contrasts with the "raised" configuration seen in FIG. 1. The raised and lowered configurations result from a degree to which the movable piece of chain guide 102 is rotated, with respect to the stationary piece of chain guide 104, about the pivot 302.

In the example shown, a flight lug 300 carried by the chain 108 is lowered below a plane on which cases travel, thereby enabling cases (e.g., cardboard boxes moving on an assembly line) or other objects to move without contact with the flight lug. (Such cases may be moved by other flight lugs, associated with different chain drives, not shown. In an example, a first flight lug may advance a case to a point in a conveyor system, and then be lowered. A second flight lug may then be raised, to further advance the case. The first and second flight lugs may advance the case in perpendicular directions.) Thus, if cases (not shown) are moving from the right and to the left, and the chain 108 is moving counter-clockwise, FIG. 3 shows that the flight lug 300 may be positioned to allow a case to move over the top of the flight lug. In contrast, FIG. 1 shows that counter-clockwise rotation of the chain would cause the flight lug 300 to push a case to the left. Thus, FIG. 3 shows how a case, moving to the left, could move over the top of the lowered flight lug 300, because the movable piece of chain guide 102 is in a lowered position. Then, by raising the movable piece of chain guide 102 into the position seen in FIG. 1, the flight lug 300 would be in a position to push the case to the left, in response to counter-clockwise rotation of the chain.

Figure 4:
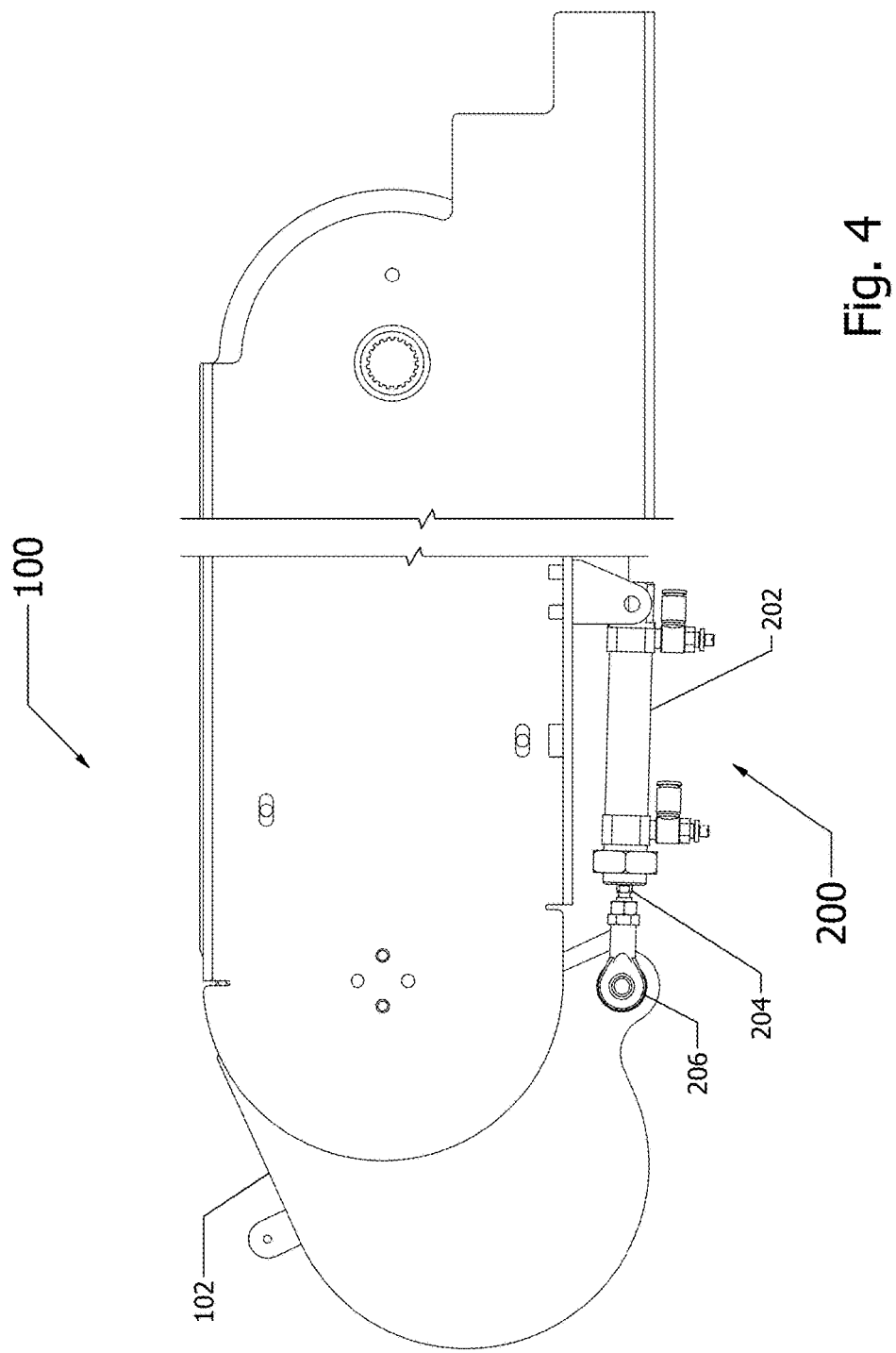
FIG. 4 an orthographic view of a reverse side of the example reconfigurable chain guide system, wherein the movable piece of chain guide is in the lowered configuration.

FIG. 4 an orthographic view of a reverse side of the example reconfigurable chain guide system 100 of FIG. 3 with the movable piece of chain guide 102 in the lowered configuration. The actuator 200 is shown in the example as the air-powered cylinder 202. The actuator drive shaft 204 has been substantially withdrawn into the air-powered cylinder 202. Movement of the actuator rod end 206 pulls on the movable piece of chain guide 102, rotating the movable piece of chain guide about the pivot and into the "lowered" configuration.

Figure 5:
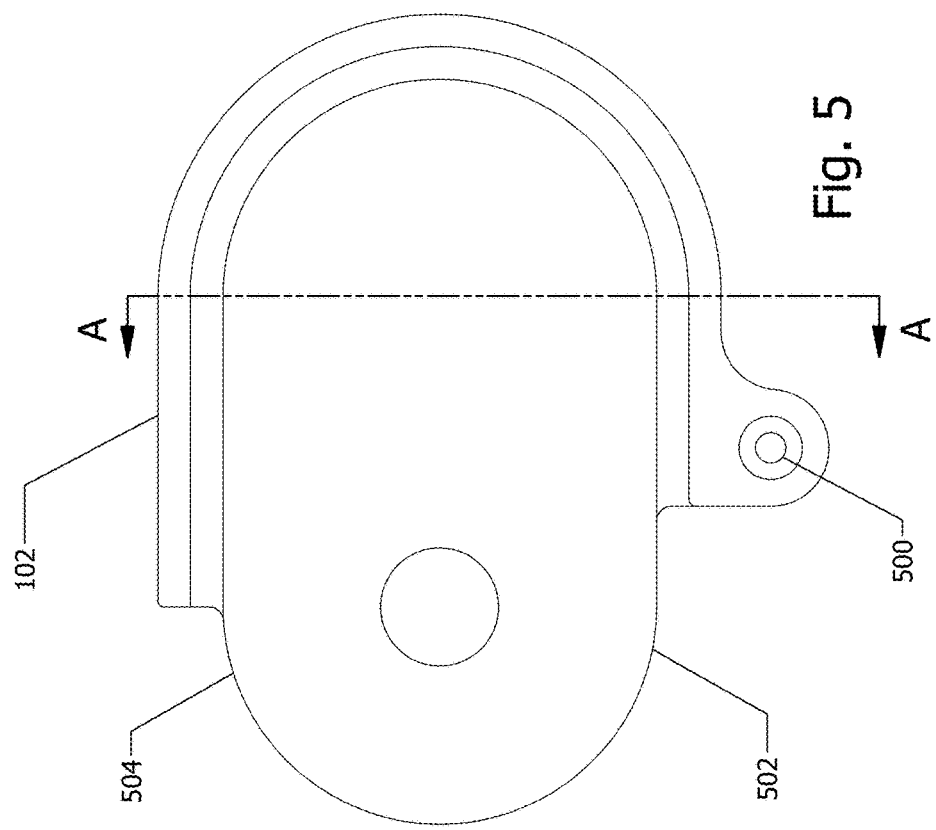
FIG. 5 is an orthographic view of an example movable piece of chain guide.

FIG. 5 is an orthographic view of an example movable piece of chain guide 102. The actuator drive shaft (seen in FIG. 2) may be connected via rod end 206 to an attachment point 500 of the movable piece of chain guide 102. In operation, as the actuator shaft is extended and/or withdrawn from the air-powered cylinder, the movable piece of chain guide 102 rotates about pivot 302 (seen in FIG. 3).

First and second curved segments 502, 504 may or may not be in contact with the chain (seen in FIGS. 1 and 3), depending on the position of the movable piece of chain guide 102. In one example, the first curved segment 502 is a portion of the chain track that is in contact with the chain when the movable piece of chain guide 102 is in the "raised" configuration of FIG. 1, while the second curved segment 504 is not in contact with the chain. Also in the example, the first curved segment 502 is not in contact with the chain when the movable piece of chain guide 102 is in the "lowered" configuration of FIG. 3, while the second curved segment 504 is in contact with the chain. When the actuator drive shaft is in motion, portions of each curved segment 502, 504 will be in contact with the chain and portions of each segment will not be in contact with the chain. The curve segments 502, 504 have similar curved shapes, resulting in a constant distance over which the chain 108 (referring to FIGS. 1 and 3) travels. Thus, the movable piece of chain guide 102 can be raised and lowered without changing the length of the track over which the chain travels, before, during and after the actuator moves the chain guide.

Figure 6:
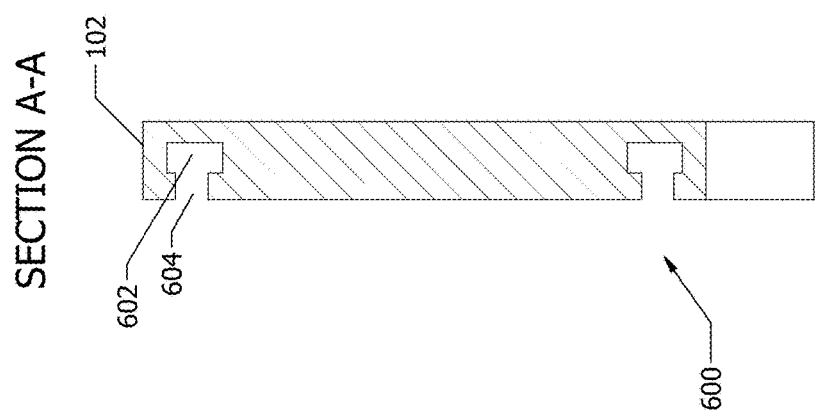
FIG. 6 is a cross-sectional view (taken along the A-A lines seen in FIG. 5) of the example movable piece of chain guide of FIG. 5.

FIG. 6 is a cross-sectional view of the example movable piece of chain guide 102 of FIG. 5. The chain track 600 may be configured as a void defined in the movable piece of chain guide 102. The chain track 600 may be similarly defined in the stationary piece of chain guide (not shown). In some examples, the movable piece of chain guide 102 and/or the stationary piece of chain guide may be made of an ultra-high molecular weight (UHIMW) material. Such a material resists wear due to contact with the chain, and provides a low-friction surface for the chain to move against. In the example chain track 600, a larger region 602 is sized to allow chain side plates to travel, and a smaller region 604 is sized to allow chain rollers to travel. The side plates of the chain are unable to pass through the smaller region 604. Accordingly, the chain is restrained within, or captured by, the chain track 600. Thus, the movable piece of chain guide 102 defines a first track which captivates a first segment of a chain 108 and the stationary piece of chain guide 104 defines a second track which captives a second segment of the chain.

Figure 7:
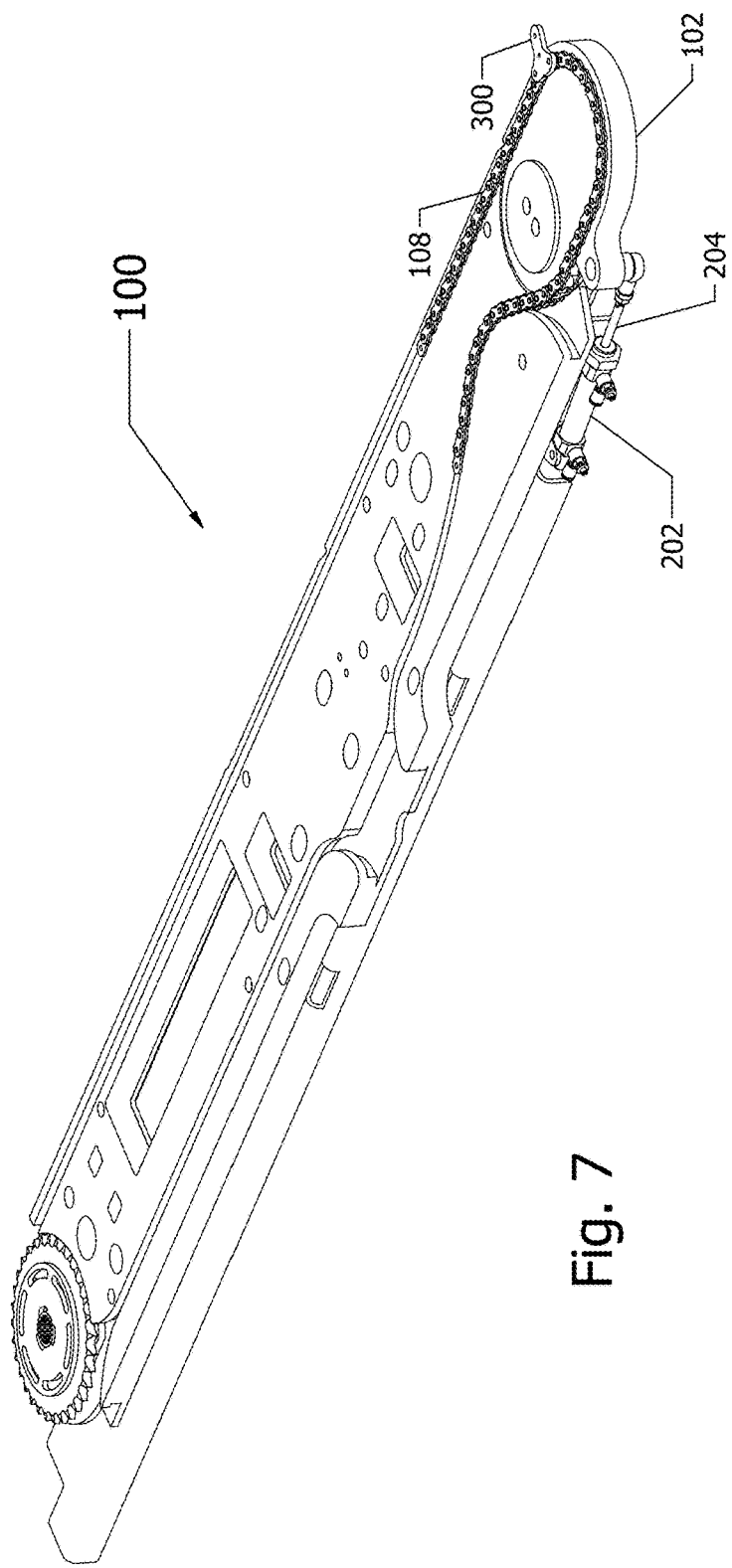
FIG. 7 is a perspective view of the example reconfigurable chain guide system, with the movable piece of chain guide in the raised configuration.

FIG. 7 is a perspective view of the example reconfigurable chain guide system 100, with the movable piece of chain guide 102 in the "raised" configuration. The actuator drive shaft 204 has extended from the air-powered cylinder 202, thereby rotating the movable piece of chain guide 102 into the "raised" configuration. In this configuration, the flight lug 300 may push a case from right-to-left as the chain 108 moves in the counter-clockwise direction (from the perspective of the view shown).

Figure 8:
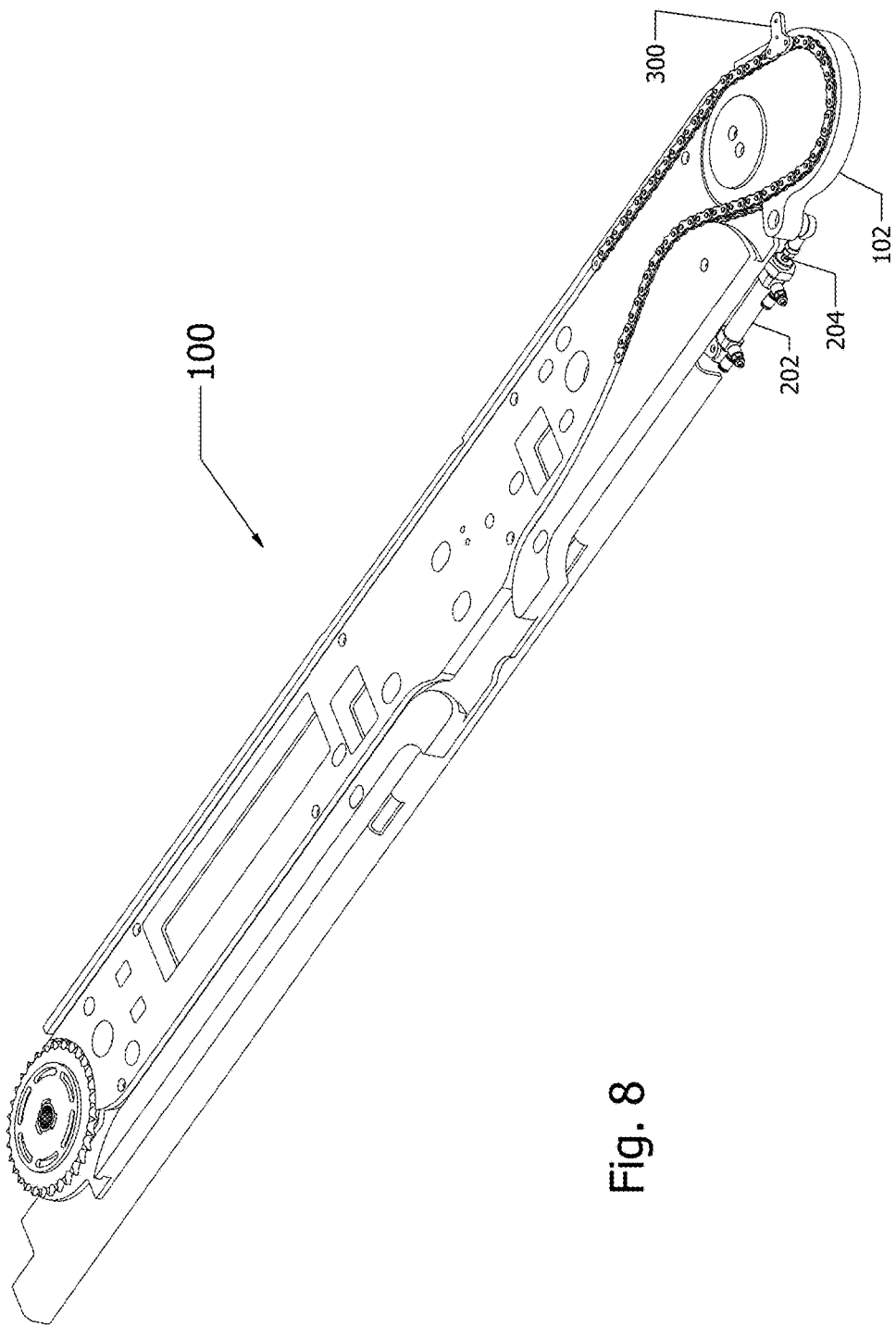
FIG. 8 is a perspective view of the example reconfigurable chain guide system, with the movable piece of chain guide in the lowered configuration.

FIG. 8 is a perspective view of the example reconfigurable chain guide system 100, with the movable piece of chain guide 102 in the "lowered" configuration. The actuator drive shaft 204 has retracted into the air-powered cylinder 202, thereby rotating the movable piece of chain guide 102 into the "lowered" configuration. In this configuration, the flight lug 300 will not contact a case as it moves right-to-left. However, a return to the "raised" configuration of FIG. 7 will allow the flight lug 300 to advance the case by pushing against its trailing side.

Example Actuator Control Methods

In some examples of the techniques discusses herein, the methods of operation may be performed by one or more application specific integrated circuits (ASIC), appropriate logic devices, or by a general purpose processor utilizing software defined in computer readable media. In the examples and techniques discussed herein, the memory 702 may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to: phase change memory (PRAM); static random-access memory (SRAM); dynamic random-access memory (DRAM); other types of random access memory (RAM); read-only memory (ROM), electrically erasable programmable read-only memory (EEPROM); flash memory or other memory technology; compact disk read-only memory (CD-ROM); digital versatile disks (DVD) or other optical storage; magnetic cassettes; magnetic tape, magnetic disk storage or other magnetic storage devices; or any other non-transitory medium that can be used to store information for access by a computing device.

As defined herein, computer-readable media does not include transitory media, such as modulated data signals and carrier waves, and/or signals.

Figure 9:
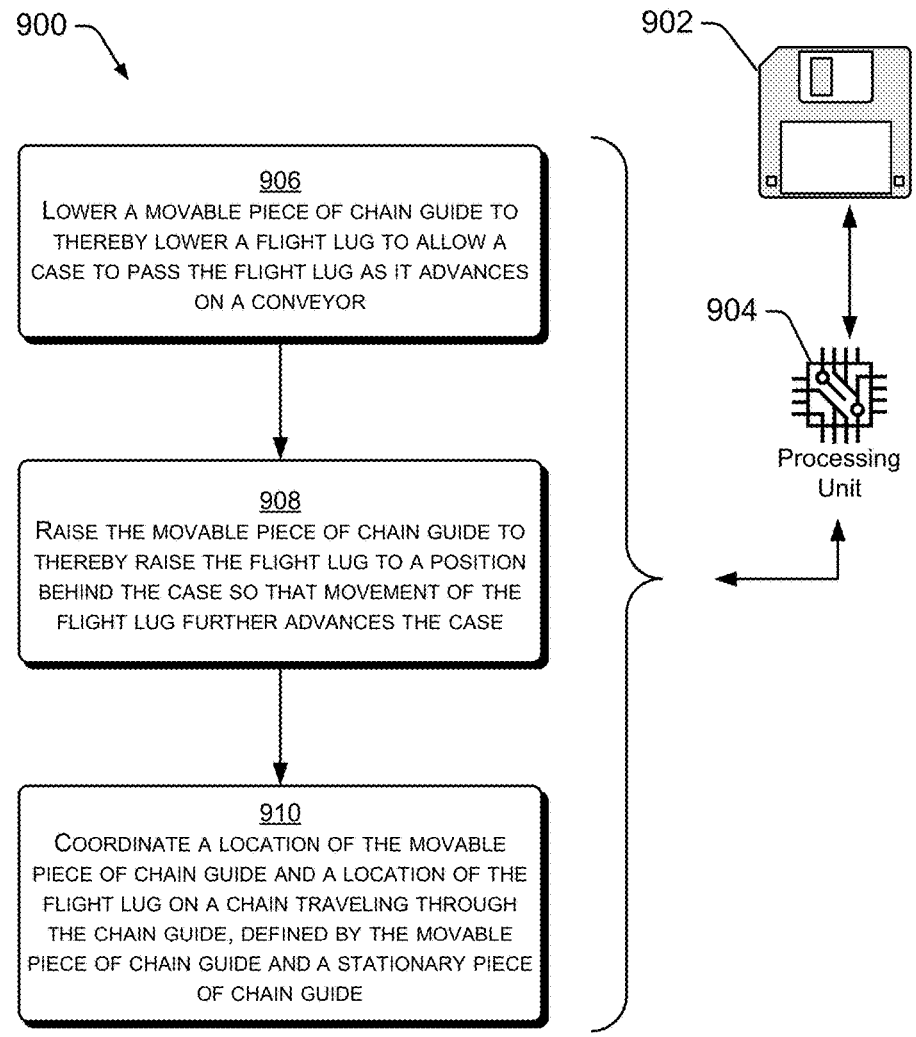
FIG. 9 is a schematic and flow diagram showing example techniques for controlling an actuator configured to reconfigure the chain guide system to move a piece of chain guide between a raised position and a lowered position.

FIG. 9 shows example techniques 900 for controlling an actuator, and to thereby reconfigure the chain guide system by moving a piece of chain guide between a raised position and a lowered position. In an example, a controller or other processing or logic unit 902 executes programming, application specific logic, ladder logic, etc., to regulate power (electric, hydraulic, compressed air, etc.) provided to the actuator. The programming or logic may be defined in memory 904 or other logic device(s). The programming may be configured to direct a movable piece of chain guide between a first position (e.g., a raised position) and a second position (e.g., a lowered position), such as those shown by FIGS. 1 and 3.

At block 906, a movable piece of chain guide is lowered. By lowering the moveable piece of chain guide, a flight lug is also lowered. Lowering of the flight lug allows a case to pass the flight lug as it advances on a conveyor. In the examples of FIGS. 1 and 3, the movable piece of chain guide 102 is lowered from a position seen in FIG. 1 to a position seen in FIG. 3.

At block 908, the movable piece of chain guide is raised, to thereby raise the flight lug carried by a chain traveling within the chain guide to a position behind the case so that movement of the flight lug further advances the case.

At block 910, a location and/or movement of the movable piece of chain guide may be coordinated with a location of a flight lug on a chain traveling through a chain path. The chain path may be defined by the movable piece of chain guide and the stationary piece of chain guide. In an example of the coordination, the movable piece of chain guide 102 can be raised when the flight lug is behind, but not underneath, a case moving on an assembly line. Thus, the flight lug will approach the case from behind, rather than from below it.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A reconfigurable chain guide, comprising:
    a movable piece of chain guide defining a first section of a chain path;
    a stationary piece of chain guide defining a second section of the chain path; and
    an actuator to pivot the movable piece of chain guide between a first position and a second position with respect to the stationary piece of chain guide, wherein a length of the chain path, defined by the movable piece of chain guide together with the stationary piece of chain guide, is not changed when the movable piece of chain guide is moved between the first position and the second position.

2. The reconfigurable chain guide as recited in claim 1, wherein the movable piece of chain guide comprises:
    a first curved segment and a second curved segment, wherein the first curved segment is in contact with a chain moving in the chain path when the movable piece of chain guide is in the first position, and wherein the second curved segment is in contact with the chain when the movable piece of chain guide is in the second position.

3. The reconfigurable chain guide as recited in claim 1, additionally comprising:
    a chain traveling within the chain path; and
    a flight lug, carried by the chain;
    wherein the flight lug is in a position to engage a case to be moved when the movable piece of chain guide is in the first position, and wherein the flight lug is not in a position to engage the case to be moved when the movable piece of chain guide is in the second position.

4. The reconfigurable chain guide as recited in claim 1, additionally comprising:
    a pivot, in contact with both the movable piece of chain guide and the stationary piece of chain guide;
    wherein the actuator moves the movable piece of chain guide about the pivot and with respect to the stationary piece of chain guide.

5. The reconfigurable chain guide as recited in claim 1, wherein:
    the movable piece of chain guide defines a first track which captivates a first segment of a chain; and
    the stationary piece of chain guide defines a second track which captives a second segment of the chain.

6. The reconfigurable chain guide as recited in claim 1, additionally comprising:
    a controller to execute programming to regulate power provided to the actuator, the programming configured for:
        lowering the movable piece of chain guide to thereby lower a flight lug to allow a case to pass the flight lug as it advances on a conveyor; and raising the movable piece of chain guide to thereby raise the flight lug to a position behind the case so that movement of the flight lug further advances the case.

7. A reconfigurable chain guide, comprising:
a movable piece of chain guide and a stationary piece of chain guide, together forming a chain path extending through the movable piece of chain guide and the stationary piece of chain guide, wherein the movable piece of chain guide is movable about a pivot to allow the movable piece of chain guide to pivot with respect to the stationary piece of chain guide; and
an actuator to pivot the movable piece of chain guide between a first position and a second position with respect to the stationary piece of chain guide;
wherein a length of the chain path, defined by the movable piece of chain guide together with the stationary piece of chain guide, is not changed when the movable piece of chain guide is pivoted between the first position and the second position.

8. The reconfigurable chain guide as recited in claim 7, wherein the movable piece of chain guide contacts a chain with a first curved segment when pivoted to the first position, and wherein the movable piece of chain guide contacts the chain with a second curved segment when pivoted to the second position.

9. The reconfigurable chain guide as recited in claim 7, wherein the movable piece of chain guide contacts a chain with a first segment when pivoted to the first position, and wherein the movable piece of chain guide contacts the chain with a second segment when pivoted to the second position.

10. The reconfigurable chain guide as recited in claim 7, additionally comprising:
a chain traveling within the chain path; and
a flight lug, carried by the chain;
wherein reconfiguration of the reconfigurable chain guide allows the flight lug to move into and out of a path followed by cases moving on a conveyor.

11. The reconfigurable chain guide as recited in claim 7, wherein the actuator comprises an air-driven cylinder.

12. The reconfigurable chain guide as recited in claim 7, additionally comprising:
a drive sprocket to drive a chain through the chain path.

13. The reconfigurable chain guide as recited in claim 7, additionally comprising:
a controller to execute programming to regulate power provided to the actuator, the programming configured for moving the movable piece of chain guide between the first position and the second position.

14. A reconfigurable chain guide, comprising:
a movable piece of chain guide;
a stationary piece of chain guide;
a pivot to couple the movable piece of chain guide and the stationary piece of chain guide; and
an actuator to pivot the movable piece of chain guide between a first position and a second position with respect to the stationary piece of chain guide;
wherein the movable piece of chain guide contacts a chain at a first segment when pivoted to the first position, wherein the movable piece of chain guide contacts the chain at a second segment when pivoted to the second position, and wherein a length of a chain path, defined by the movable piece of chain guide together with the stationary piece of chain guide, is not changed when the movable piece of chain guide is moved between the first position and the second position.

15. The reconfigurable chain guide as recited in claim 14, wherein the first segment and the second segment are curved segments.

16. The reconfigurable chain guide as recited in claim 14, additionally comprising:
a chain traveling within a chain path defined at least in part by the movable piece of chain guide and the stationary piece of chain guide; and
a flight lug, carried by the chain;
wherein a distance through which the movable piece of chain guide moves is based at least in part on a size of the flight lug.

17. The reconfigurable chain guide as recited in claim 14, wherein the actuator is used at least in part to control a location of a flight lug traveling on a chain carried by the movable piece of chain guide and the stationary piece of chain guide.

18. The reconfigurable chain guide as recited in claim 14, additionally comprising:
a drive sprocket to drive a chain through a chain path defined by the movable piece of chain guide and the stationary piece of chain guide.

19. The reconfigurable chain guide as recited in claim 14, additionally comprising a controller to execute programming comprising steps for:
coordinating a location of the movable piece of chain guide and a location of a flight lug on a chain traveling through a chain path defined by the movable piece of chain guide and the stationary piece of chain guide.

* * * * *